United States Patent [19]
Legkow

[11] Patent Number: 5,928,495
[45] Date of Patent: Jul. 27, 1999

[54] EMULSION FOR HEAVY OIL DILUTION AND METHOD OF USING SAME

[76] Inventor: Alexander Legkow, Caracas, Venezuela

[21] Appl. No.: 08/567,324

[22] Filed: Dec. 5, 1995

[51] Int. Cl.$^6$ .................................................. C01G 17/00
[52] U.S. Cl. ............................ 208/13; 208/434; 585/6.3; 585/240; 252/353
[58] Field of Search .................................... 585/240, 434, 585/6.3; 252/353; 208/13, 14

[56] References Cited

U.S. PATENT DOCUMENTS

| | | |
|---|---|---|
| 3,617,529 | 11/1971 | Thompson et al. . |
| 3,619,376 | 11/1971 | Patel et al. . |
| 3,777,817 | 12/1973 | Feurbaccher ............................ 166/273 |
| 3,905,948 | 9/1975 | Vargiu et al. . |
| 3,927,716 | 12/1975 | Burdyn et al. .......................... 166/270 |
| 3,932,267 | 1/1976 | Lewis ....................................... 208/87 |
| 3,947,706 | 3/1976 | Holmes .................................... 324/105 |
| 3,977,470 | 8/1976 | Chang ..................................... 166/273 |
| 4,004,368 | 1/1977 | Burdyn .................................... 166/273 |
| 4,234,386 | 11/1980 | Stirling . |
| 4,246,966 | 1/1981 | Stoddard et al. . |
| 4,250,961 | 2/1981 | Morse et al. . |
| 4,265,731 | 5/1981 | Mitchell . |
| 4,377,599 | 3/1983 | Willard . |
| 4,477,337 | 10/1984 | Ronden et al. . |
| 4,480,691 | 11/1984 | Herter et al. . |
| 4,484,928 | 11/1984 | Keller . |
| 4,493,302 | 1/1985 | Kawamura .............................. 123/357 |
| 4,518,481 | 5/1985 | Marin . |
| 4,570,656 | 2/1986 | Matlach et al. . |
| 4,585,547 | 4/1986 | Nicholson . |
| 4,619,768 | 10/1986 | Takahashi et al. . |
| 4,863,618 | 9/1989 | Falls . |
| 4,903,901 | 2/1990 | Kim et al. . |
| 4,936,047 | 6/1990 | Feldmann et al. . |
| 4,993,448 | 2/1991 | Karydas et al. . |
| 5,000,757 | 3/1991 | Puttock et al. . |
| 5,066,310 | 11/1991 | Huettenhain et al. . |
| 5,068,043 | 11/1991 | Thigpen ............................... 252/855.4 |
| 5,076,812 | 12/1991 | Getsoian . |
| 5,087,269 | 2/1992 | Cha et al. . |
| 5,114,599 | 5/1992 | Debons et al. . |
| 5,123,931 | 6/1992 | Good et al. . |
| 5,240,592 | 8/1993 | Meyer et al. . |
| 5,251,383 | 10/1993 | Williams . |
| 5,294,353 | 3/1994 | Dill ........................................ 252/309 |
| 5,322,530 | 6/1994 | Merriam et al. . |
| 5,401,425 | 3/1995 | Prukop . |
| 5,435,170 | 7/1995 | Voelker et al. ......................... 204/400 |
| 5,447,571 | 9/1995 | Kuchner et al. . |
| 5,495,062 | 2/1996 | Abel ........................................ 588/1 |
| 5,613,238 | 3/1997 | Mouk et al. ............................. 588/1 |
| 5,641,433 | 6/1997 | Chirnos et al. ........................ 252/312 |
| 5,678,231 | 10/1997 | Mouk et al. ............................ 588/18 |

OTHER PUBLICATIONS

Emulsions and Foams, Berkman Reinhold Pub. pp. 187, 188, 1941.

Walstra, Pieter, Principles of Emulsion Formation, *Chemical Eningeering Science, Inc.*, vol. 48, No. 2, pp. 333–349, 1993.

*Primary Examiner*—Helane Myers
*Attorney, Agent, or Firm*—Wolf, Greenfield & Sacks, P.C.

[57] ABSTRACT

A surfactant which is capable being used to enhance accessing, storing and transporting carbonaceous materials such as crude oil or coal. The surfactant includes a dielectric surfactant having a predetermined range of pH. The dielectric surfactant may include a pH-modifying agent. In one embodiment, the dielectric surfactant may be combined with crude oil to reduce the viscosity of the crude oil. In another embodiment, the dielectric surfactant is capable of extracting sulfur containing compounds from crude oil. In a further embodiment, a gaseous emulsion may be combined with a gas phase material to produce a complex.

11 Claims, 3 Drawing Sheets

EMULSION FOR HEAVY OIL DILUTION AND METHOD OF USING SAME

BACKGROUND OF THE INVENTION

1. Field of the Invention

The present invention relates generally to surfactants that include a dielectric sludge, and more specifically to such surfactants which are prepared for use with carbonaceous materials including oil and coal.

2. Discussion of the Related Art

Many industries throughout the world are at least partially dependent on the use of carbonaceous materials as fuels. Among the different carbonaceous materials, crude oil and coal are the most common. However, crude oil and coal are difficult to access. In addition, processing of these materials includes removal of impurities by methods that are usually expensive and cumbersome to perform.

Crude oil exists in subterranean reservoirs throughout the world, and, prior to use, this material must first be removed from the reservoirs. Typically, the crude oil is removed through wells which are drilled into the reservoirs. The oil is extracted from the subterranean reservoirs by pumping, but, due to the relatively high viscosity of crude oil, such pumping is difficult.

Existing methods for reducing the viscosity of crude oil predominantly include the of solvents and/or crude oil at elevated temperature. However, as the temperature of the mixture decreases, the crude oil becomes thicker, making it more difficult for subsequent transportation such as through pipelines. Therefore, these methods often utilize heating stations to maintain the elevated temperature of the mixture, but, even with the use of such heating stations, a residual may be left which eventually leads to blockage of the pipeline. Hence, these methods are relatively expensive and can be ineffective.

Surfactants have also been used to reduce the viscosity of crude oil, but the Surfactants used in currently available methods are generally expensive and difficult to produce.

Subsequent to its extraction from the subterranean reservoirs and prior to its purification, the crude oil may be stored in tanks for several days. During this time, sludge may settle at the bottom of these tanks and remain there after the crude oil is removed. As a result, the tanks should be cleaned to remove the sludge. However, this process can be time consuming and expensive.

Purifying crude oil usually includes removing impurities and separating the various constituents of the crude oil. Typically, both impurity removal and crude oil separation are performed by distillation or refining processes which are well known in the art, but crude oil often contains certain compounds, such as sulfurous compounds, that are not removed by distillation or refinement. It is desirable to remove these sulfur containing compounds from crude oil because they have a broad range of utility in various processes such as organic synthesis.

U.S. Pat. No. 3,617,529 discloses a method for removing elemental sulfur contaminants from petroleum oils containing less than 1–1.5% elemental sulfur. This reference discloses that sulfur may be removed from the oil prior to refinement by mixing the oil with an aqueous solution containing sodium hydrosulfide or a mixture of sodium hydrosulfide and sodium hydroxide and/or ammonium hydroxide. Once the reaction is complete, the aqueous phase is separated from the oil and the sulfur is purified from the aqueous phase. However, while this method has some degree of success, it is comparatively expensive to carry out on an industrial scale.

Other methods of removing sulfur-containing impurities from crude oil include reacting the crude oil with sulfuric acid or alkali. In addition, absorption techniques are commonly used to remove impurities. Moreover, catalytic methods have been used to purify crude oil, but these techniques have limited success and can be rather expensive.

Coal is another carbonaceous material that is commonly used as a fuel. In addition, coal is often modified to form coke, a coal by-product, which is used as a reducing agent in the iron and steel industries.

The chemical composition, and therefore quality, of coal varies widely depending upon the location of the coal deposit. In general, high quality coal has a relatively low percentage of impurities and is relatively easy to process. However, high quality coal is usually located relatively deep within the earth so that accessing the coal is comparatively difficult. In contrast, lower quality coal is located relatively close to the earth's surface, making it easier to access. However, this coal is difficult to process due to its relatively high percentage of impurities. Thus, there exists a trade-off between the cost of accessing coal and the cost of processing coal, and, in many cases, it is preferable to use lower quality coal due to its much lower accessing costs.

One problem with using low quality coal is that sulfur compounds and nitrogen compounds are common impurities. Upon combustion, both $SO_x$ and $NO_x$ materials are produced and these materials create pollution that is believed to result in acid rain. Furthermore, various carbon containing gases that may cause the greenhouse effect are produced. Hence, there has been an active effort to lower the amount of these pollutants produced by the combustion of coal.

U.S. Pat. No. 4,936,037 discloses a method for enhancing sulfur capture during combustion or gasification of coal. The method includes mixing the coal with a sulfur absorbent prior to exposing the coal to high temperature. The sulfur absorbent used includes calcium oxide, calcium hydroxide, calcium carbonate, limestone, dolomite or a mixture of these materials. However, while this method can be effective in removing sulfur from coal, the sulfur is not recovered in the form of a readily usable material.

U.S. Pat. No. 5,240,592 discloses a short residence time, hydrodisproportionation process that utilizes thermohydrocracking to produce hydrocarbon products without producing sulfur or nitrogen containing gases. While this method is highly effective in reducing $SO_x$ and $NO_x$ compounds, the method is expensive and cannot be used for producing a coke product sufficient for use in the iron or steel industry.

Systems used in coking industries within industrialized nations, such as the United States, are sophisticated and fairly effective in reducing pollution, but they are also very expensive. As a result, they are not used in many non-industrialized nations, including many South American countries.

A typical coking "factory" in South America consists of a grouping of several furnaces in close proximity to the coal mines. Generally, these furnaces have only chimneys, filters or hives to reduce environmental contamination. As a result, the rate of pollution is increasing dramatically within these countries. Therefore, it is desirable to provide a method of purifying the gaseous by-products of coal combustion to reduce or eliminate the amount of sulfur and nitrogen containing compounds produced.

Therefore, it remains a challenge in the art to provide a material or method that is capable of increasing the efficiency of crude oil processing while maintaining a relatively low cost. It also remains a challenge in the art to develop a comparatively inexpensive material or method that can reduce pollution from coal combustion.

SUMMARY OF THE INVENTION

Accordingly, It is an object of the present invention to provide a surfactant for use with carbonaceous materials including crude oil and coal as well as a method of making such a surfactant.

It is another object of the present invention to provide a surfactant which is capable of lowering the viscosity of oil.

It is yet another object of the present invention to provide a method of using a surfactant to assist in the pumping oil.

It is still another object of the present invention to provide a surfactant which is capable of removing certain impurities from oil.

It is a further object of the present invention to provide a gaseous emulsion which is capable of removing carbonaceous materials or residue.

It is yet a further object of the present invention to provide a gaseous emulsion which is capable of reducing pollution caused by the combustion of various carbonaceous materials such as coal.

It is still a further object of the present invention to provide a method of using a gaseous emulsion to assist in reducing pollution caused by the combustion of various carbonaceous materials such as coal.

In one illustrative embodiment, the present invention comprises a dielectric surfactant having a pH of from about 4 to about 12.

In another illustrative embodiment, the present invention comprises a surfactant that is capable of reducing the specific gravity of crude oil. The surfactant comprises a dielectric sludge and pH-modifying agent present in an amount sufficient to lower the specific gravity of the oil to from about 15 A.P.I. to about 30 A.P.I.

In a further illustrative embodiment, the present invention comprises a method of pumping oil. The method includes the step of combining the oil with a surfactant so that the specific gravity of the crude oil is from about 15 A.P.I. to about 30 A.P.I.

In still a further illustrative embodiment, the present invention comprises a method of extracting a sulfurous compound from crude oil with a surfactant that includes a dielectric sludge having a pH of from about 4 to about 12. The method includes the step of mixing the oil with the surfactant to form an emulsion. The emulsion has an aqueous phase, and the sulfurous compound preferentially segregates to the aqueous phase.

In yet a further illustrative embodiment, the present invention comprises a method of combining a gaseous product of the combustion or pyrolysis of a carbonaceous material with a gaseous emulsion.

It is a feature of the present invention that the viscosity of the carbonaceous materials may be reduced by combining a dielectric emulsion with the carbonaceous material. This can create an exothermic reaction which can raise the temperature.

It is another feature of the present invention that a gaseous emulsion may combine with certain gaseous species to produce a complex.

In certain embodiments, it is an advantage of the present invention that the materials used to formulate a surfactant are relatively inexpensive and readily available.

DETAILED DESCRIPTION

Figure 1:
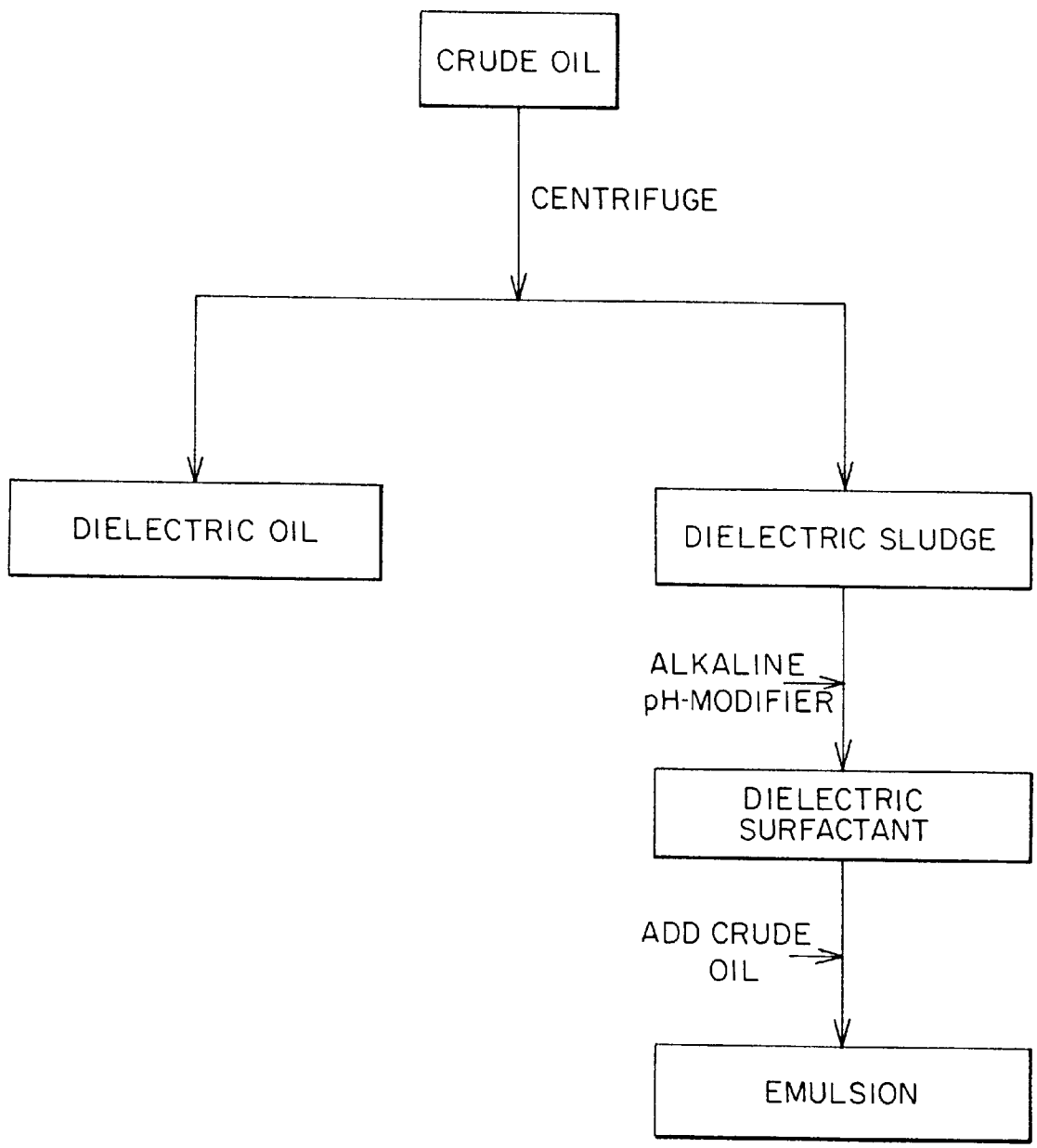
FIG. 1 is a flow chart of a process of forming an emulsion from a dielectric surfactant and crude oil according to the present invention.
Figure 2:
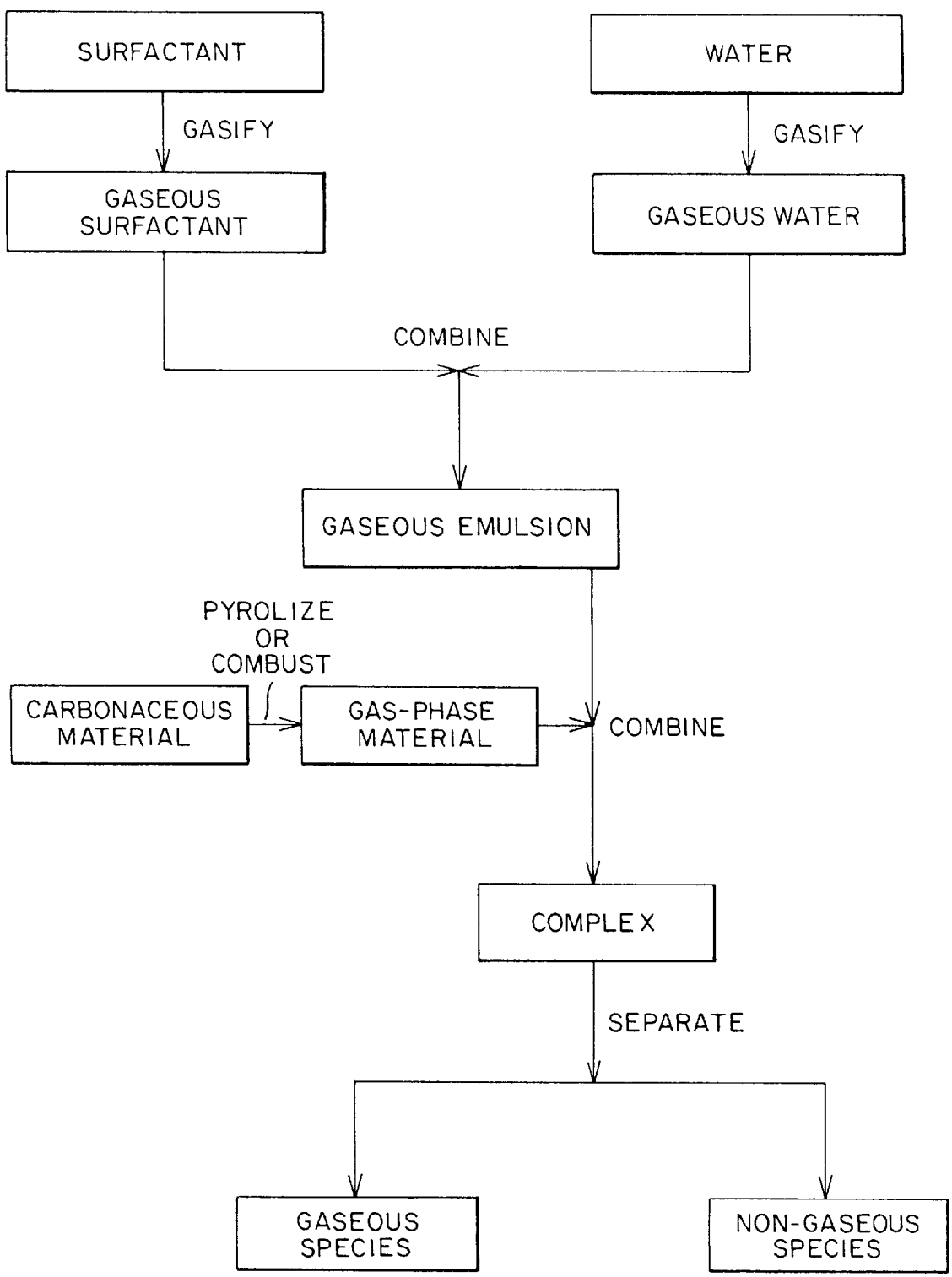
FIG. 2 is a flow chart of a process of forming a reduced toxicity product according to the present invention.

The present invention relates to a surfactant that may be used in the extraction and/or processing of carbonaceous fuels such as crude oil and coal. The surfactant may include a dielectric sludge having a pH from about 4 to about 12. Alternatively, the surfactant may be a dielectric surfactant including a dielectric sludge and a pH-modifying substance.

A "surfactant" as used herein refers to a surface-active agent capable of reducing the surface tension between two liquids or a liquid and a solid.

A "dielectric sludge" as used herein denotes a by-product of the refinement of a crude oil. Typically, a dielectric sludge is considered to be a waste material. The crude oil is typically refined by a centrifugation process that results in a high quality industrial oil appropriate for use in electric transformers and a dielectric sludge. However, it is to be understood that a dielectric sludge may be formed by other methods which are known to those skilled in the art.

A "crude oil" is a hydrocarbon that may contain certain impurities. These impurities may include sulfur containing compounds such as sulfurous ions and sulfonated hydrocarbons. Preferably, a crude oil is paraffin based, naphthene based, or paraffin-naphthene based. Paraffin compounds are aliphatic, saturated hydrocarbons which may further include relatively small amounts of unsaturated hydrocarbons and other carbon containing compounds. The paraffin compounds usually have from about 4 to about 35 carbon atoms, and the unsaturated hydrocarbons usually include about 21 to about 26 carbon atoms. Naphthenes are cyclic hydrocarbons such as hydroaromatics, cycloparaffins and hydrogenated benzenes. A naphthene based dielectric oil includes mainly naphthenes and alkenes but may also include other carbon containing compounds, such as aromatic hydrocarbons, which have from about 2 to about 20 hydrocarbons.

A "dielectric surfactant" herein refers to the reaction product of a dielectric sludge and a pH-modifying substance. A dielectric surfactant may further include a varying amount of water. The amount of water and pH-modifying substance added to a dielectric sludge can control the pH of a dielectric surfactant. The pH of a dielectric surfactant may be selected based on the use of the dielectric surfactant. For example, a dielectric surfactant designed to assist in pumping crude oil should have a pH between about 4 and about 12. However, a dielectric surfactant designed to assist in transporting oil through pipelines should have a pH from about 7 to about 10 so that the walls of the pipeline are not damaged. While certain pH ranges for a dielectric surfactant have been disclosed herein, it is to be appreciated that a dielectric surfactant may have any pH so long as it includes a dielectric sludge and a pH modifying agent.

A "pH-modifying agent" is an agent capable of modifying the hydrogen ion concentration of a dielectric sludge to form a dielectric surfactant. Preferably, the pH-modifying agent comprises an alkali, more preferably an hydroxide containing alkali and most preferably sodium hydroxide (caustic soda).

According to the present invention, a dielectric surfactant may be provided by combining a dielectric sludge with a pH-modifying agent. The sludge may be added to the agent, or the agent may be added to the sludge. The amount of sludge and agent used should be selected so that the dielectric surfactant has a desired or predetermined pH. Alternatively, sludge and agent may be combined, and the dielectric surfactant's pH may be tested and altered if desired. To test the pH, any standard method, such as using litmus paper or performing an acid-base litration, may be used. The amount of agent and sludge may be adjusted until the desired pH is achieved. In certain embodiments, it may be advantageous to add water when forming a dielectric surfactant. FIG. 1 is a flow chart of a process of forming a dielectric surfactant in accordance with the present invention.

In certain embodiments, a dielectric surfactant can react with crude oil to form an emulsion. An "emulsion" as used herein refers to a stable mixture of two immiscible liquids. Preferably, a dielectric surfactant and crude oil form a stable emulsion that can remain stable even when significant amounts of water are added thereto. In some cases, an emulsion may require substantial agitation to be maintained.

It is believed that emulsions according to the present invention have an aqueous phase which is relatively alkaline and an organic phase which is relatively acidic. The aqueous phase is dispersed within the organic phase. Thus, the aqueous phase of the emulsion can extract polar compounds located within the crude oil. In addition, acidic species, such as hydrofluoric acid and sulfuric acid, within the crude oil can segregate to the aqueous phase and be neutralized. Furthermore, the aqueous phase may be effective in the removal of other impurities from the crude oil. These impurities may comprise various sulfur containing compounds. For example, the aqueous phase of an emulsion may react with sulfonated hydrocarbons located within crude oil to break C-S bonds and form sulfurous ions which preferentially segregate to the aqueous phase. Preferably, the impurities that segregate to the aqueous phase can be subsequently recovered in useful forms, such as sulfuric acid or hydrogen sulfide.

In some cases, the amount of dielectric surfactant added to the crude oil may determine the amount of sulfur containing impurities removed from the crude oil. For example, if about 5% dielectric surfactant by volume having a pH of about 4.5 is added to crude oil, the aqueous phase of the emulsion can contain from about 2 to about 2.5% sulfur by weight. Alternatively, if about 4% dielectric surfactant by volume is added to crude oil, the aqueous phase of the emulsion may contain from about 3 to about 3.5% sulfur by weight.

For certain embodiments, combining a dielectric surfactant with crude oil may form a mixture. A "mixture" comprises an aqueous phase and an organic phase which are not interdispersed. Thus, a mixture includes two distinct phases. The type of mixture formed by the dielectric surfactant and the crude oil depends upon the relative amount of surfactant added to the crude oil. For example, when using a dielectric surfactant having a pH of about 4.5, a mixture including about 6% dielectric surfactant by weight results in a mixture having the aqueous phase disposed above the organic phase. However, if the mixture includes about 6.5% dielectric surfactant by weight, the organic phase may be disposed above the aqueous phase.

According to some embodiments, combining a dielectric surfactant with crude oil can form a crystalline structure. Alternatively, the combination of dielectric surfactant and crude oil may result in a material capable of having fungus grow thereon. For example, if a combination of dielectric surfactant and crude oil comprises about 7% dielectric surfactant by weight, crystals may form. Furthermore, if a combination of dielectric surfactant and crude oil includes about 8% dielectric surfactant by weight, a fungus may form on the combination within a relatively short time period, such as half an hour.

A dielectric surfactant may be capable of assisting in accessing, storing and transporting crude oil by reducing the viscosity of the crude oil. The reduction in viscosity of the crude oil allows the oil to be pumped from subterranean reservoirs more readily, increasing the yield of crude oil. In addition, in some embodiments, the viscosity of the crude oil may be reduced without elevating the temperature of the crude oil by adding heat. Instead the crude oil and dielectric surfactant can react in an exothermic reaction which creates any amount of heat that may be desirable. According to the present invention, any known method of adding steam, or other appropriate materials to crude oil in a subterranean reservoir may be used to add a dielectric surfactant to such crude oil. For example, a separate pipe may be drilled into the reservoir for addition of the dielectric surfactant to the crude oil. Alternatively, the same pipe may be used to add the dielectric surfactant as is used to pump out the crude oil. In some embodiments, it may be adavantageous to use an agitation device, such as a stirrer, to increase the mixing to the dielectric surfactant with the crude oil. Preferably, a dielectric surfactant is added to the crude oil such that certain impurities, including hydrogen sulfide and sulfuric acid may be recovered, such as by subsequent heating to remove relatively volatile products from the emulsion.

The reduced viscosity crude oil can be stored in tanks with relatively little or no carbonaceous residual formation. Moreover, an emulsion formed by a dielectric surfactant and a crude oil can be used to remove a carbonaceous material, such as a residuum, from storage tanks or other areas. The emulsion reduces the viscosity of the carbonaceous material which increases its flow rate. This reduction in viscosity can occur without increasing the temperature of the carbonaceous material.

The reduced viscosity crude oil is more readily transported through pipelines. Due to its lower viscosity, the crude oil flows more readily, and heating stations along pipelines can be eliminated. Moreover, for conditions of sever cold weather, such as in Alaska or Siberia, an agent can be added to the emulsion to reduce the freezing temperature of the emulsion. One exemplary and nonlimiting class of such agents are alcohols.

For embodiments in which a dielectric surfactant is used to reduce the specific gravity of crude oil, the crude oil preferably has a specific gravity of between about 15 A.P.I and about 30 A.P.I, more preferably between 18 A.P.I. and about 28 A.P.I. and most preferably between 20 A.P.I. and about 27 A.P.I. "A.P.I." as used herein refers to the well known scale of measurement used by the American Petroleum Institute in connection with oils.

It should be noted that the amount of dielectric surfactant added to crude oil may effect the specific gravity of the crude oil. For example, if about 5% dielectric surfactant by volume having a pH of about 4.5 is added to crude oil, the specific gravity of the crude oil can be between about 20 A.P.I. and about 27 A.P.I. Alternatively, if about 4% dielectric surfactant by volume is added to crude oil, the specific gravity of the crude oil may be from about 15 A.P.I. to about 20 A.P.I.

Other amounts of dielectric surfactant can have similar effects on the specific gravity of crude oil.

While the reduction of viscosity of crude oil located in subterranean reservoirs has been disclosed herein, a simple test that does not require the crude oil to be in such a reservoir can be used for determining a dielectric surfactant composition appropriate for obtaining a desired or predetermined crude oil viscosity. The crude oil may be removed from the reservoir using techniques known to those skilled in the art. Small samples of crude oil may then be placed in containers and dielectric surfactants of various compositions may be combined with the different crude oil samples. Each dielectric surfactant/crude oil system may then have its viscosity measured according to standard methods.

The present invention also relates to gaseous emulsions that can assist in the separation of gas phase materials. A "gaseous emulsion" as used herein refers to an emulsion, such as a liquid emulsion, that has been gasified. Gasification can occur, for example, by heating or evaporation. A gaseous emulsion need not include a surfactant. However, a gaseous emulsion preferably includes a surfactant, more preferably a dielectric surfactant. For embodiments which include a surfactant, the surfactant may be combined with water to form a gaseous emulsion prior to gasification and reaction with the gas phase pollutants.

"Carbonaceous materials" herein refers to carbon containing compounds. Typically carbonaceous materials include oils. Carbonaceous materials may be refined or raw materials and include, but are not limited to, bituminous coals, subbituminous coals, lignite, peat, anthracite, crude oil, natural gas, shales and tar sands. Usually, a carbonaceous material includes coal which is undergoing a coking process. However, it is to be understood that, while certain carbonaceous materials have been disclosed herein, carbonaceous materials are limited only in that their combustion or pyrolysis products are capable of reacting with a gasified emulsion to produce less toxic product molecules.

"Gas phase materials" as used herein include the combustion or pyrolysis of certain carbonaceous materials, including certain pollutants. Combustion or pyrolysis products are various in nature and can depend upon the carbonaceous material and the conditions under which the carbonaceous material is combusted or pyrolized. For example, pyrolysis of coal can produce oxygen, hydrogen and nitrogen containing compounds in the form of ammonia, dinitrogen, carbon dioxide, carbonic anhydride, CHN, tars, oils, paraffins, phenols, benzene, naphthene, anthracene, phenolic acid, free carbon, methane, carbon monoxide and other gases. However, it should be appreciated that a gas phase material is limited only in that such a material should be capable of reacting with a gaseous emulsion to form less toxic product molecules.

According to the present invention, any emulsion (including emulsions without surfactants) may be heated or evaporated to form a gaseous emulsion which is combined with a volatile product of pyrolysis or combustion of a carbonaceous material (i.e., gas phase materials). It is believed that the gaseous emulsion attracts the gas phase material to form a comlex. A "complex" as used herein refers to an agglomeration of district chemical species. In some embodiments, forming a complex reduces the probability that a gas phase material can be released into the atmosphere. In one embodiment, a gaseous emulsion is formed by combining a dielectric surfactant with water in a liquid phase. This mixture is then heated or evaporated to form a gas which is reacted with a volatile product of pyrolysis or combustion of the carbonaceous material. In some cases, to increase the reaction rate between the gaseous emulsion and the combustion or pyrolysis product, an agitation device may be used to mix the reactants. Such agitation devices are known to those skilled in the art and are intended to be within the scope of the present invention.

Subsequent to the reaction attraction of the gas phase material to the gaseous emulsion, the reaction products can be separated. One method of separation includes passing the complex through a condensation chamber so that products of higher molecular weight become liquids while lighter products remain in the gas phase. Hence, the components of the complex are separated based on molecular weight. Other methods of separating the components of the complex are known to those skilled in the art and are intended to be within the scope of the present invention.

Figure 3:
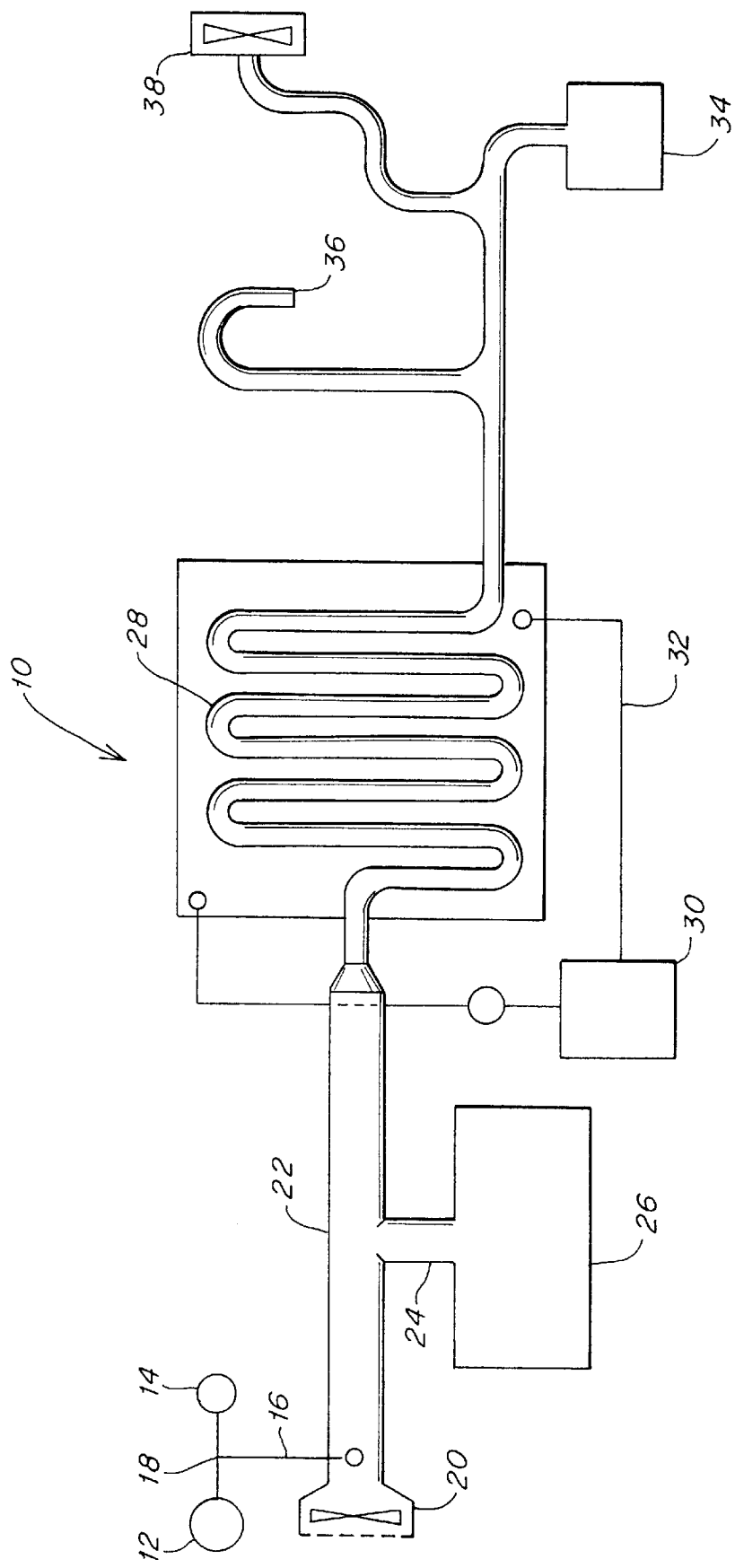
FIG. 3 is a schematic diagram of a process of reacting a surfactant with a gaseous species according to the present invention.

FIG. 3 shows one embodiment of an apparatus 10 which may be used to combine surfactant with a gas phase material according to the present invention. Apparatus 10 includes a surfactant source 12 and a water source 14. Surfactant from source 12 may be combined with water from source 14 at emulsion duct 16. The amount of surfactant and water contained within the emulsion formed at duct 16 can be controlled by regulator valve 18. A gas pressure biasing device 20 can be used to assist in transporting the emulsion along emulsion mixing chamber 22 which passes by exhaust 24 of furnace 26. Gases emanating from furnace 26 and attracted to the gaseous emulsion to form a complex which is passed into a refrigerated coil 28. Coil 28 includes refrigerator 30 having refrigerant circulation network 32. As the complex travels through coil 28, higher molecular weight species become liquefied and are ultimately collected in liquid collection portion 34. Such liquefied species typically include pitch and tar. Components of the complex that are not liquefied when passing through coil 28 are collected at gas duct 36. It is to be noted that, under certain reaction conditions, the gaseous species collected at gas duct 36 may be combustible. To assist in transportation of reaction and product species through apparatus 10, a gas extraction device 38 may be used. While particular elements of apparatus 10 and a specific arrangement of these elements have been disclosed herein, other elements and arrangements thereof may be used in accordance with the present invention. An apparatus used to combine a gaseous emulsion with gaseous products of the combustion or pyrolysis of a carbonaceous species is limited only in that it allow the emulsion to react with the combustion or pyrolysis products. It is preferable that such an apparatus include a device for separating the various product species of this reaction. Such devices are known to those skilled in the art and are intended to be within the scope of the present invention.

The following illustrative and nonlimiting examples demonstrate certain embodiments of the present invention. As such, it is not to be construed as in any way limiting the scope of the present invention.

EXAMPLE 1

A dielectric surfactant was produced in a tank having a vertical agitator with an electric motor capable of rotating it 500 rpm. Four ounces of dielectric sludge, 8 ounces of caustic soda and 200 liters of water were placed within the tank and were agitated with the vertical agitator for approximately 2 hours. An additional 8 ounces of dielectric sludge, 16 ounces of caustic soda and 400 liters of water were slowly added to the tank over the course of approximately 6 hours with continued agitation. At the end of the mixing process, the pH of the product was verified to be within the critical range of 4.8 to 12.

EXAMPLE 2

A tar material comprised (by weight percent) 1.5% paraffin, 12% viscous oil, 18% nonviscous oil, 60% phenol and 8.5% tar. The gaseous products of pyrolysis of the tar material at 800° C. were 2.5% dinitrogen, 8% CHN, 5.5% carbon monoxide, 65% methane, 10% dihydrogen and 9% carbon dioxide.

EXAMPLE 3

A tar material comprised (by weight percent) 5% benzene (and homologs), 10% medium oil and naphthene, 3% anthracene, 2% phenol, 20% phenolic acid, 40% tar and 20% free carbon. The gaseous products of pyrolysis of the tar at 1000° C. were 2.5% dinitrogen, 3.5% CHN, 8% carbon monoxide, 50% methane, 34% dihydrogen and 2% carbon dioxide.

Having thus described certain embodiments of the invention, various alterations, modifications and improvements will readily occur to those skilled in the art. For example, a gas pressure biasing device may comprise a fan. In addition, an extraction device may include a fan. Moreover, a refrigerator coil may be cooled by a refrigerant with or without the use of a compressor. In some embodiments, dielectric surfactants may be combined with each other or with crude oil under conditions that result in an explosive release of energy. For example, a dielectric surfactant having a pH of 4 may be combined with a dielectric surfactant having a pH of 9 to form such an explosive reaction. Such alterations, modifications and improvements are intended to be part of this disclosure, and are intended to be within the spirit and scope of the invention. Accordingly, the foregoing description is to be taken by way of example only and is not intended as limiting. The invention is limited only as defined in the following claims and the equivalents thereto.

What is claimed is:

1. A dielectric surfactant, comprising:
    a reaction product of a dielectric sludge, said sludge being a by-product of crude oil refinement, and a quantity of a pH-modifying agent, said quantity selected to yield a desired predetermined final pH value of the dielectric surfactant.

2. The dielectric surfactant according to claim 1, wherein the dielectric surfactant has a pH of about 7 to about 10.

3. The surfactant according to claim 1, further comprising a pH-modifying agent.

4. The surfactant according to claim 3, wherein the pH-modifying agent is an alkaline agent.

5. A surfactant comprising:
    a dielectric sludge that is a by-product of crude oil refinement; and
    a pH-modifying agent present in an amount sufficient to lower a specific gravity of crude oil to a range of between about 15 A.P.I. to about 30 A.P.I.

6. The surfactant according to claim 5, wherein the pH-modifying agent is present in an amount sufficient to lower the specific gravity of crude oil to a range of between about 18 A.P.I. to about 28 A.P.I.

7. The surfactant according to claim 5, wherein the pH-modifying agent is present in an amount sufficient to lower the specific gravity of crude oil to a range of between about 20 A.P.I. to about 27 A.P.I.

8. The surfactant according to claim 5, wherein the pH-modifying agent is an alkaline agent.

9. The surfactant according to claim 5, wherein the dielectric sludge is a naphthene-based dielectric sludge.

10. The surfactant according to claim 5, wherein the dielectric sludge is a paraffin-based dielectric sludge.

11. The dielectric surfactant according to claim 1, wherein the dielectric surfactant has a pH of from about 4 to about 12.

* * * * *